US012338343B2

(12) United States Patent
Niessner

(10) Patent No.: US 12,338,343 B2
(45) Date of Patent: Jun. 24, 2025

(54) POLYMER COMPOSITIONS THAT CONTAIN A SEMI-CRYSTALLINE POLYMER, AND PROCESS OF PREPARATION

(71) Applicant: INEOS STYROLUTION GROUP GMBH, Frankfurt am Main (DE)

(72) Inventor: Norbert Niessner, Friedelsheim (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 776 days.

(21) Appl. No.: 17/605,140

(22) PCT Filed: Apr. 28, 2020

(86) PCT No.: PCT/EP2020/061793
§ 371 (c)(1),
(2) Date: Oct. 20, 2021

(87) PCT Pub. No.: WO2020/221764
PCT Pub. Date: Nov. 5, 2020

(65) Prior Publication Data
US 2022/0195163 A1  Jun. 23, 2022

(30) Foreign Application Priority Data

Apr. 29, 2019  (EP) ..................................... 19171513

(51) Int. Cl.
| C08L 23/12 | (2006.01) |
| C08K 7/14 | (2006.01) |
| C08K 7/20 | (2006.01) |
| C08L 51/06 | (2006.01) |
| B29K 23/00 | (2006.01) |

(52) U.S. Cl.
CPC ............... *C08L 23/12* (2013.01); *C08K 7/14* (2013.01); *C08K 7/20* (2013.01); *C08L 51/06* (2013.01); *B29K 2023/12* (2013.01); *C08L 2201/08* (2013.01); *C08L 2203/30* (2013.01); *C08L 2205/16* (2013.01); *C08L 2205/18* (2013.01); *C08L 2205/24* (2013.01)

(58) Field of Classification Search
CPC ... C08K 7/02; C08K 7/04; C08K 7/08; C08K 7/10; C08K 7/14; C08L 2205/16; C08L 23/04; C08L 23/0815; C08L 23/14
See application file for complete search history.

(56) References Cited

U.S. PATENT DOCUMENTS

| 4,098,734 | A | 7/1978 | Lee |
| 4,603,153 | A | 7/1986 | Sobajima et al. |
| 10,988,615 | B2 * | 4/2021 | Yamada .................. C08L 23/02 |
| 2011/0263778 | A1 | 10/2011 | Honma et al. |
| 2015/0073076 | A1 | 3/2015 | Kim et al. |
| 2015/0218353 | A1 | 8/2015 | Zhu et al. |

FOREIGN PATENT DOCUMENTS

| CN | 102558685 | A | 7/2012 |
| CN | 102911433 | A | 2/2013 |
| CN | 102924815 | A | 2/2013 |
| CN | 103772825 | A | 5/2014 |
| CN | 103788470 | A | 5/2014 |
| CN | 103819811 | A | 5/2014 |
| CN | 104419058 | A | 3/2015 |
| CN | 107118437 | A | 9/2017 |
| CN | 107815013 | A | 3/2018 |
| CN | 108164822 | A | 6/2018 |
| EP | 0363608 | A1 | 4/1990 |
| EP | 0945253 | A2 | 9/1999 |
| EP | 3184586 | A1 | 6/2017 |
| JP | S5263954 | A | 5/1977 |
| JP | H1160828 | | 3/1999 |
| KR | 1020150007340 | A | 1/2015 |
| WO | 2008058971 | A | 5/2008 |
| WO | 2009065589 | A1 | 5/2009 |
| WO | 2010074120 | A1 | 7/2010 |
| WO | 2013138158 | A1 | 9/2013 |
| WO | 2016101139 | A1 | 6/2016 |
| WO | 2016154791 | A1 | 10/2016 |
| WO | WO 2017/159418 | * | 9/2017 |
| WO | 2018114979 | A1 | 6/2018 |
| WO | 2019010672 | A | 1/2019 |

OTHER PUBLICATIONS

Handbook of Fillers, 5th Edition authored by Wypych and published by Chem Tec Publishing, Toronto 2021.*
"Xylylenediamine Derived Polyamide Resin for High Mechanical Strength Composite Material" available at https://speautomotive.com/wp-content/uploads/2021/02/TP_Matsumoto_Mitsubishi-Gas-Chemical-Co_Xylylenediamine-Derived-Polyamide-Resin-for-High-Mechanical-Strength-Composite-Material.pdf (no date).*
https://www.wax-emulsions.com/pe-waxes/#:~:text=LDPE%20waxes%20have%20densities%20ranging,range%20from%200.95%20to%200.98. (no date).*
The material property data sheet for PA66 at https://www.matweb.com/search/DataSheet.aspx?MatGUID=e95795afec4f46539c51269e453cba2b&ckck=1 (no date).*
Material property data sheet for E-Glass fibers generally at https://www.matweb.com/search/DataSheet.aspx?MatGUID=d9c18047c49147a2a7c0b0bb1743e812 (no date).*
"High Strength Glass Fibers" (2006) published online by agy.*
Plastics Europe at https://plasticseurope.org/plastics-explained/a-large-family/polyolefins/#:~:text=PP%20(polypropylene)%3A%20The%20density,resistance%2C%20but%20less%20chemical%20resistance.*

(Continued)

*Primary Examiner* — Marc S Zimmer
(74) *Attorney, Agent, or Firm* — RAPHAEL BELLUM PLLC

(57) ABSTRACT

The invention relates to polymer compositions that contain a thermoplastic molding compound A, at least one reinforcing fiber B and at least one inorganic filler material C, the polymer composition having excellent aesthetic quality after thermoplastic processing. The invention also relates to a process for preparing the claimed composition and to uses thereof.

19 Claims, No Drawings

(56) References Cited

OTHER PUBLICATIONS

H. Zweifel et al.: Plastics Additives Handbook, Hanser Verlag, vol. 6, 2009, p. 40, 64, p. 246-329, p. 563-580, p. 855-868, p. 883-889.
International Search Report in International Application No. PCT/EP2020/061793, dated Jun. 17, 2020.
Jordens et al., "Terahertz spectroscopy to study the orientation of glass fibres in reinforced plastics," Composites Science and Technology, 2010, vol. 70, pp. 472-477.
Karian, "Handbook of Polypropylene and Polypropylene Composites," CRC Press, 2003, pp. 58 and 328-332.
"Adstif HA840R" LyondellBasell, Dec. 22, 2008, pp. 1-2.
"ChopVantage HP3299," Chopvantage HP3299, Product Description, Nippon Electric Glass, Dec. 2017, pp. 1-2.
Yalcin et al., "3M Glass Bubbles IM16K for Reinforced Thermoplastics" 3M, 2016, pp. 1-5.
"3M iM30K Hi-Strength Glass Bubbles" 3M, Paintings and Coatings Technical Information, 2008, pp. 1-2.
"Polypropylene EE013AE Polypropylene Reactor Elastomer Modified," Borealis AG, Sep. 02, 2010, pp. 1-3.
"ThermoFlow Chopped Strand 636 for PP," Johns Manville, Jul. 2011, pp. 1-2.
Pasquini, "Polypropylene Handbook," Hanser Publishers, 2005, pp. 314-315.
Morelli et al., "Influence of Hybridization of Glass Fiber and Talc on the Mechanical Performance of Polypropylene Composites," Journal of Applied Polymer Science, vol. 114, pp. 3592-3601, 2009.
Biron, "Thermoplastics and Thermoplastic Composites," 3rd Ed., Elsevier Ltd. 2018, pp. 246 and 838.
Sathishkumar et al., "Glass fiber-reinforced polymer composites—a review," Journal of Reinforced Plastics and Composites, 2014, vol. 33(13), pp. 1258-1275.
Hartikainen et al. "Polypropylene hybrid composites reinforced with long glass fibres and particulate filler," Journal of Composites Science and Technology, 2005, vol. 65, pp. 257-267.
Harikainen et al., "Mechanical properties of polypropylene composites reinforced with long glass fibres and mineral fillers," Plastics, Rubbers, and Composites, 2004, vol. 33(2/3), pp. 77-84.
Zweifel et al. "Plastics Additives Handbook" Hanser, 6th edition, 2002, pp. 922, 923, 933, 939, 944, 945.

* cited by examiner

POLYMER COMPOSITIONS THAT CONTAIN A SEMI-CRYSTALLINE POLYMER, AND PROCESS OF PREPARATION

The present invention relates to polymeric compositions comprising a thermoplastic molding composition A, at least one reinforcing fiber B and at least one inorganic filler C, where the polymeric composition has high esthetic quality after thermoplastic processing. The invention further relates to a process for the production of the composition of the invention and to uses thereof.

In certain applications, for example in injection moldings for the automobile exteriors sector, it is desirable to provide polymeric materials which have high impact resistance at low temperature and a reduced coefficient of linear thermal expansion and high resistance to temperature-related deformation. It is often preferable that the coefficient of linear thermal expansion (CLTE, measured according to ASTM D696 or in accordance with ISO 11359-1 and ISO 11359-2) is less than $10.0 \cdot 10^{-6}$ K$^{-1}$, preferably less than $7.0 \cdot 10^{-6}$ K$^{-1}$, in particular determined in the temperature range of 21 to 49° C. (70 to 120° F.). Extreme temperature effects can lead to failure to achieve precise fit between various components of the finished module. A door component or wheel-surround component that expands excessively under conditions of extreme heat leads to buckling or incorrect matching in the assembled finished product, for example.

Another property that is often important is impact resistance at low temperatures. This is tested by measuring to what extent the polymeric material cracks when subjected to an impact; this measurement is often based on impact resistance in relation to falling darts.

Improved coefficients of linear thermal expansion can generally be obtained by incorporating a relatively large quantity of fillers, but this often results in significant reduction of impact resistance, in particular impact resistance at low temperature, often to an unacceptable level. Fibrous reinforcement materials, for example glass fiber, are typically highly effective in lowering the coefficient of linear thermal expansion. However, such fibers are typically visible on the surface of the resultant object, thus providing reduced surface quality that is often unacceptable.

Glass fibers, in particular fibers with diameter about 5-15 μm and substantially greater length, typically exhibit anisotropic shrinkage behavior, which adversely affects the smooth, flat and often glossy surface of the plastic.

Accordingly, it would be desirable to provide an improved polymeric composition which has a reduced coefficient of linear thermal expansion while maintaining acceptably high impact resistance, in particular in relation to darts, and also low notch sensitivity (improved impact resistance) and good surface quality.

The U.S. Pat. No. 4,098,734 discloses mixtures which comprise a matrix interpolymer, a grafted rubber copolymer, a further polymer with a solubility parameter in the range of 8.5 to 13 and an inorganic filler. Examples are described comprising an ABS resin, about 14% of a clay and polymethyl methacrylate or cellulose butyrate.

The document JP 55263954 describes polymer mixtures composed of 20 to 45% by weight of an ABS resin, 45 to 20% by weight of a polycarbonate and 5 to 30% by weight of talc. It is said that such compositions lack suitable heat-distortion properties, and that toughness is inadequate, for example when measured via dart impact resistance or notched Izod impact resistance.

In particular, the bonding of fibers and polymer matrix to one another is an important factor in the production of polymeric compositions and moldings comprising reinforced fibers. Another variable that has a considerable effect on the properties of the polymeric material is the stability of the embedding of the fibers into the polymer matrix (fiber-matrix adhesion). It should moreover be easy and inexpensive to carry out the process for the production of the materials.

Because it is possible to vary not only the fibers but also the matrix materials, there are numerous possible combinations of fibers and matrix materials that can be used. Lack of chemical similarity between the fiber surface and the surrounding polymer matrix is often a reason for low attraction, and therefore low adhesion, between fiber and matrix material.

In order to optimize fiber-matrix adhesion and to compensate for low chemical similarity between components, e.g. components A and B, reinforcing fibers are generally pretreated with what is known as a size.

This size (size composition) is often applied to the fibers during the production process in order to improve the further-processability of the fibers (examples being weaving, laying, stitching). In some cases, reinforcing fibers B, for example glass fibers, are also processed without size. Said glass fiber sizes often comprise a large number of different components, particular examples being film-formers, lubricants, wetting agents and adhesion promoters.

Treatment of reinforcing fibers with a size serves inter alia to prevent damage to the fibers by abrasion or to facilitate the procedure of cutting of the fiber. Use of the size can moreover avoid agglomeration of the fibers and can improve the dispersibility of fibers in water. However, a size can also assist in obtaining improved coherence between the glass fibers and the polymer matrix in which the glass fibers are acting as reinforcing fibers. This principle is applied especially in the case of glassfiber-reinforced plastics (GRP). Adhesion promoters in the size can typically increase the adhesion of polymers on the fiber surface by forming a bridging layer between the surfaces. Organofunctional silanes are often used, examples being aminopropyltriethoxysilane, methacryloxypropyltrimethoxysilane, glycidyloxypropyltrimethoxysilane and the like.

WO 2008/058971 describes molding compositions which can comprise various groups of reinforcing fibers. The various groups of reinforcing fibers are respectively provided with various adhesion promoter components which are intended to bring about the respective fiber-matrix adhesions. Matrix materials proposed are thermosets, for example polyesters, and thermoplastics, for example polyamide and polypropylene.

WO 2010/074120 describes a fiber-reinforced polypropylene resin composition comprising a reinforcing fiber, a substantially unmodified polypropylene resin and two further polypropylene resins comprising a carboxy-modified polypropylene resin, where the molecular weight of the various polypropylene resins is defined.

Glassfiber-reinforced polypropylene resins are moreover described by way of example in ON-A 102 558685, ON-A 102911433, ON 102924815, ON-A 103788470, ON-A 103819811, ON-A 104419058, ON-A 103772825, WO 2016/101139, WO 2016/154791, ON-A 107 815013, ON-A 107118437, WO 2019/010672 and ON-A 108164822.

It is an object of the invention to provide an improved polymeric composition and, respectively, an improved polymeric material, preferably based on a semicrystalline polymer, in particular on a semicrystalline polyolefin, where said composition has a low coefficient of thermal expansion, good robustness and high surface quality (i.e. little surface undulation), and is also resistant to stress-cracking and to solvents. The polymeric composition is moreover to be suitable for the production of moldings, films and coatings. Production of the polymeric composition is moreover to be inexpensive and possible in a widely used process with the shortest possible cycle times.

Surprisingly, it has been found that the surfaces of fiber-filled materials whose appearance is often impaired by the shrinkage behavior of the fiber component can be improved by adding components having isotropic shrinkage, preferably inorganic fillers, with low volume shrinkage similar to that of glass fibers. In a preferred embodiment, fibers take the form of fiber bundles, where in particular it has been found here that particularly low shrinkage and a particularly esthetically pleasing surface of a polymer composition with the abovementioned properties can be obtained if the fiber-matrix ratio is approximately the same both within and outside of the volume occupied by the fiber.

Ideally this is achieved when the thermoplastic matrix comprises (outside of the volume occupied by the fiber) up to about 70% by weight of filler which has a coefficient of linear thermal expansion (CLTE coefficient of linear thermal expansion) significantly lower than that of the thermoplastic polymer of the matrix. If a smaller proportion of filler is realized, the shrinkage differences are typically merely reduced.

Surprisingly, it has been found that improved properties of the polymeric composition are obtained if the thermoplastic molding composition comprising a semicrystalline, and optionally an amorphous, polymer (e.g. polymers selected from styrene-acrylonitrile copolymers, polycarbonate, polyamide, polypropylene) moreover has a polymer component A2 which has a chemically reactive functionality which can react with chemical groups on the surface of the reinforcing fiber and which is capable—at least to some extent—of chemical linkage to the inorganic fillers. In particular, the use of propylene-maleic anhydride graft copolymers with a selected proportion of maleic anhydride as functional monomer has proven to be particularly advantageous for A2.

The present invention provides a polymeric composition comprising:
  a) 20 to 79% by weight, preferably 25 to 55% by weight, of a thermoplastic molding composition A, where the thermoplastic molding composition A comprises at least one semicrystalline polymer A1, preferably at least one semicrystalline polyolefin polymer A1, and optionally comprises at least one polymer A2 comprising at least one functional monomer A2-I;
  b) 10 to 79% by weight, preferably 20 to 60% by weight, of at least one reinforcing fiber B, preferably selected from inorganic or organic reinforcing fibers, in particular selected from glass fibers and/or carbon fibers, particularly preferably from glass fibers:
  c) 1 to 70% by weight, preferably 5 to 35% by weight, of at least one inorganic filler C, and
  d) 0 to 10% by weight, preferably 0.01 to 10% by weight, more preferably 0.1 to 5% by weight, of at least one further additive D, preferably selected from processing aid, stabilizers, lubricants and mold-release agents, flame retardants, dyes, pigments and plasticizers;

where the at least one inorganic filler C has a coefficient of linear thermal expansion $\alpha_C$ (CLTE, coefficient of linear thermal expansion, measured in accordance with ISO 11359-1 and ISO 11359-2) which is smaller than the coefficient of linear thermal expansion $\alpha_A$ of the thermoplastic molding composition A, (i.e. $\alpha_C < \alpha_A$);

where the at least one inorganic filler C has a volume shrinkage which is 0.1 to 10 times, preferably 0.2 to 5 times, as great as the volume shrinkage of the reinforcing fiber B, where the volume shrinkage is calculated from the coefficient of thermal volume expansion $\alpha_V$ in 1/K of the respective component multiplied by the proportion of the respective component in the polymeric composition in % by volume/100, where:

$$\frac{\alpha_{V,C} \times \text{proportion by volume of } C}{\alpha_{V,B} \times \text{proportion by volume of } B} = 0.1 - 10$$

where
  $\alpha_{V,C}$=coefficient of thermal volume expansion of C in 1/K,
  where $\alpha_{V,C}=3*\alpha_C$;
  proportion by volume of C=proportion by volume of C, based on the entire polymeric composition, in % by volume/100;
  $\alpha_{V,B}$=coefficient of thermal volume expansion of B in 1/K,
  where $\alpha_{V,B}=3*\alpha_B$;
  proportion by volume of B=proportion by volume of B, based on the entire polymeric composition, in % by volume/100;
and where the data in % by weight and in % by volume respectively are based on the entire polymeric composition.

For the purposes of the present invention, the coefficient of linear thermal expansion $\alpha$ (CLTE, coefficient of linear thermal expansion) is determined in accordance with ISO 11359-2 (in particular ISO 11359-2:1999), where ISO 11359-1 (in particular ISO 11359-1:2014) describes the general principles relating to the thermomechanical test methods. The coefficient of linear thermal expansion $\alpha$ (in particular the average coefficient of linear thermal expansion a) is typically calculated with the unit 1/K as follows:

$$\alpha = \frac{\Delta L}{\Delta T} \times \frac{1}{L_0}$$

where
  $\Delta L$=change of length of the test sample between two temperatures $T_1$ and $T_2$:
  $\Delta T$=temperature change (=$T_2-T_1$);
  $L_0$=reference length of the sample at room temperature in the direction of measurement.

The size and location of the temperature range $\Delta T$ is typically selected in accordance with the standards ISO 11359-1,2. The coefficient of thermal expansion is typically determined in a temperature range $\Delta T$ in the range of 30-200° C., in particular 40-150° C., in particular 70-120° C.

The coefficient of thermal volume expansion $\alpha_V$ is typically obtained by using "volumes" to replace "length" expressions in the equation above. For the purposes of approximation, it can often be assumed that the coefficient of thermal volume expansion $\alpha_V$ corresponds to three times the coefficient of linear thermal expansion $\alpha$ ($\alpha_V=3*\alpha$). A value averaged over two or three of the dimensions of the test sample is often used as coefficient of linear thermal expansion $\alpha$. By analogy with the coefficient of linear thermal expansion:

$$\alpha_V = \frac{\Delta V}{\Delta T} \times \frac{1}{V_O}$$

For the purposes of the present invention, the volume shrinkage of the at least one filler C is calculated as follows:

$$\Delta V_C = \alpha_{V,C} \times \text{proportion by volume of } C \left[\text{in } \frac{\% \text{ by volume}}{100}\right]$$

where the proportion by volume of C is based on the entire polymeric composition, and where approximately $\alpha_{V,C}=3*\alpha_C$.

For the purposes of the present invention, the volume shrinkage of the at least one reinforcing fiber B is calculated as follows:

$$\Delta V_B = \alpha_{V,B} \times \text{proportion by volume of } B \left[\text{in } \frac{\% \text{ by volume}}{100}\right]$$

where the proportion by volume of B is based on the entire polymeric composition, and where approximately $\alpha_{V,B}=3*\alpha_B$.

The following equation moreover applies to the ratio $\Delta V_C/\Delta V_B$:

$$\frac{\Delta V_C}{\Delta V_B} = \frac{\alpha_{V,C} \times \frac{\text{proportion by weight of } C \left[\text{in } \frac{\% \text{ by weight}}{100}\right]}{\text{density of } C \left[\text{in } \frac{g}{cm^3}\right]}}{\alpha_{V,B} \times \frac{\text{proportion by weight of } B \left[\text{in } \frac{\% \text{ by weight}}{100}\right]}{\text{density of } B \left[\text{in } \frac{g}{cm^3}\right]}}$$

A preferred embodiment of the invention provides a polymeric composition comprising (preferably consisting of):
a) 20 to 79% by weight, preferably 25 to 55% by weight, of a thermoplastic molding composition A, where the thermoplastic molding composition A comprises at least one semicrystalline polyolefin polymer A1, and optionally at least one further polymer A2 comprising at least one functional monomer A2-I, and where the at least one semicrystalline polyolefin polymer A1 is selected from:
semicrystalline homo- or copolymers of ethylene, propylene, butylene and/or isobutylene, and where the polymer A2 is a polymer of ethylene, propylene, butylene and/or isobutylene, where the polymer moreover comprises at least one functional monomer A2-I selected from maleic anhydride, N-phenylmaleimide, tert-butyl (meth)acrylate and glycidyl-(meth)acrylate;
b) 10 to 79% by weight, preferably 20 to 60% by weight, of at least one reinforcing fiber B selected from glass fibers and/or carbon fibers, preferably from glass fibers;
c) 1 to 70% by weight, preferably 1 to 60% by weight, particularly preferably 5 to 35% by weight, of at least one inorganic filler C and
d) 0 to 10% by weight, preferably 0.1 to 5% by weight, of at least one further additive D.

In embodiments in which the optional component D is present, it is in particular possible to adjust the proportion of the thermoplastic molding composition A correspondingly, thus obtaining, or not exceeding, 100% by weight.

In a preferred embodiment, the proportions of the components A, B, C and optionally D provide precisely 100% by weight of the composition.

Thermoplastic Molding Composition A

The polymeric composition comprises at least 20% by weight, generally at least 30% by weight, based on the total weight of the polymeric composition, of the thermoplastic molding composition A. The quantity of thermoplastic molding composition A present in the polymeric composition is 20 to 79% by weight, preferably 25 to 55% by weight, based on the entire polymeric composition.

It is preferable that the quantity of the thermoplastic molding composition A present in the polymeric composition is from 20 to 80% by volume, preferably 30 to 70% by volume, and with particular preference 50 to 60% by volume, based on the polymeric composition.

The thermoplastic molding composition A comprises at least one semicrystalline polymer A1, by way of example selected from polyesters, polyamides and polyolefins, and optionally comprises at least one polymer A2, which comprises at least one functional monomer A2-I. It is preferable that the semicrystalline polymer A1 is a semicrystalline polyolefin polymer A1. The thermoplastic molding composition A can optionally moreover comprise at least one amorphous polymer, for example polystyrenes (PS), styrene/acrylonitrile copolymers (PSAN), acrylonitrile/butadiene/styrene copolymers (ABS), acrylate/styrene/acrylonitrile copolymers (ASA), or polycarbonates.

In a preferred embodiment, the thermoplastic molding composition A comprises 1 to 100% by weight, based on the entire molding composition A, of the at least one semicrystalline polymer A1 selected from polyamide, polypropylene and polyethylene. The thermoplastic molding composition A can preferably comprise 0 to 99% by weight of the at least one polymer A2 and/or A3, respectively based on the entire thermoplastic molding composition A.

In a preferred embodiment, the thermoplastic molding composition A comprises 60 to 99.9% by weight, preferably 70 to 99.9% by weight, particularly preferably 75 to 99.9% by weight, with particular preference 90 to 99% by weight, more preferably 94 to 97% by weight, of the at least one semicrystalline polymer A1, in particular of the semicrystalline polyolefin polymer A1, and 0.1 to 40% by weight, preferably 0.1 to 30% by weight, particularly preferably 0.1 to 20% by weight, with particular preference 1 to 10% by weight, more preferably 3 to 6% by weight, of the at least one polymer A2, respectively based on the entire thermoplastic molding composition A.

It is preferable that the thermoplastic molding composition A consists of the component A1, and it is particularly preferable that it consists of the components A1 and A2.

In another embodiment, the thermoplastic molding composition A comprises the polymer components A1 and A2 and optionally one or more further polymer components A3. The optional polymer component A3 can typically be selected from any desired thermoplastic polymer differing from A1 and A2. By way of example, the optional polymer component A3 can be selected from polystyrenes (PS), styrene/acrylonitrile copolymers (PSAN), acrylonitrile/butadiene/styrene copolymers (ABS), acrylate/styrene/acrylonitrile copolymers (ASA), polycarbonates, polyesters, polyamides, polyolefins. In particular, the optional polymer component A3 is selected from polyethylene, ethylene/propylene copolymers, styrene polymers and styrene/acrylonitrile copolymers. The polymer A3 can preferably be one or more amorphous polymers. In particular, the thermoplastic molding composition A has less than 50% by weight content of amorphous polymers, in particular amorphous polymers A3.

The thermoplastic molding composition A preferably comprises:
- 50 to 99.9% by weight, preferably 70 to 99.9% by weight, particularly preferably 79 to 98% by weight, with particular preference 95 to 97% by weight, of the semicrystalline polyolefin polymer A1;
- 0.1 to 20% by weight, preferably 0.1 to 10% by weight, particularly preferably 1 to 6% by weight, with particular preference 3 to 5% by weight, of the at least one polymer A2
- 0 to 49.9% by weight, preferably 0 to 29.9% by weight, preferably 1 to 20% by weight, of at least one further polymer component A3;
- where the data in % by weight respectively are based on the total weight of the thermoplastic molding composition A. It is preferable that the thermoplastic molding composition consists of the components A1, A2 and A3, The Semicrystalline Polymer A1

It is preferable that the thermoplastic molding composition A comprises at least 50% by weight, preferably at least 60% by weight, in particular at least 80% by weight, of the at least one semicrystalline polymer A1, preferably of the at least one semicrystalline polyolefin polymer A1, based on the entire thermoplastic molding composition A. It is preferable that the thermoplastic molding composition A comprises a quantity, based on the entire thermoplastic molding composition A, in the range of 70 to 99.9% by weight, preferably 90 to 99% by weight, particularly preferably 94 to 99% by weight, of the at least one polymer A1.

For the purposes of the present invention, the expression "semicrystalline polymer" means a polymer with less than 60% amorphous content, preferably less than 50% by weight, particularly preferably less than 40% by weight. For the purposes of the present invention, the expression "semicrystalline polyolefin polymer" means a polyolefin polymer with less than 60% amorphous content, preferably less than 50% by weight, particularly preferably less than 40% by weight. The crystalline and, respectively, amorphous content in a polymer can be determined by conventional methods, e.g. by means of DSC or x-ray structural analysis, and is typically stated in % by weight. Semicrystalline thermoplastics, for example semicrystalline polyolefins, generally form regular geometric regions (crystallites), Crystallites are typically parallel bundles of molecular sections or folds of molecular chains, and individual chain molecules here can pass to some extent through the crystalline or the amorphous region and/or indeed can simultaneously belong to a plurality of crystallites.

It is preferable that the semicrystalline polyolefin polymer A1 is a semicrystalline homo- or copolymer of ethylene, propylene, butylene and/or isobutylene. The polymer A1 preferably comprises at least 80% by weight of propylene units. With particular preference, the semicrystalline polymer A1 is one or more polypropylene homopolymers.

In a preferred embodiment, the semicrystalline polyolefin polymer A1 is one or more semicrystalline polypropylene homopolymers, where the polypropylene homopolymer has less than 60% by weight of amorphous content, preferably less than 50% by weight, with particular preference less than 40% by weight, based on the polyolefin polymer A1. The crystalline content of the semicrystalline polymer A1 is typically in the range of 40 to 80% by weight, preferably 50 to 70% by weight, particularly preferably 60 to 80% by weight.

It is preferable that the polyolefin polymer A1 is one or more polypropylene homopolymers, where the polypropylene homopolymers have a melt volume rate (determined in accordance with DIN EN ISO 1133 at 230° C./2.16 kg) in the range of 50 to 70 ml/10 min, often about 60 ml/10 min. It is preferable that the polyolefin polymer A1 is one or more polypropylene homopolymers with a density <0.95 g/cm$^3$, in particular in the range of 0.89 to 0.93 g/cm$^3$, preferably 0.895 to 0.915 g/cm$^3$.

It is preferable that the polyolefin polymer A1 is one or more propylene homopolymers with a modulus of elasticity (measured in accordance with DIN EN ISO 178) in the range of 1500 to 2100 MPa, often about 1800 MPa, and/or with a crystallization temperature (measured by means of DSC) in the range of 120 to 140° C., often about 130° C.

The polyolefin polymer A1 is typically one or more polypropylene homopolymers with a mainly isotactic structure. It is preferable that it is one or more polypropylene homopolymers which have a crystalline content in the range of 40 to 80% by weight, preferably 50 to 70% by weight, particularly preferably 60 to 80% by weight.

The Polymer A2

The optional polymer A2 differs from polymer A1 and comprises at least one functional monomer unit A2-I The thermoplastic molding composition A preferably comprises at least 0.1% by weight, preferably at least 1% by weight, particularly preferably at least 3% by weight, of the at least one polymer A2, based on the entire thermoplastic molding composition A.

It is preferable that the thermoplastic molding composition A comprises a quantity of the at least one polymer A2 in the range of 0.1 to 30% by weight, preferably 0.1 to 10% by weight, particularly preferably 1 to 6% by weight, with particular preference 3 to 5% by weight, based on the entire thermoplastic molding composition A.

The polymer A2 typically serves as compatibilizer between thermoplastic molding composition A and reinforcing fiber B. The polymer A2 typically has at least one chemically reactive functionality (typically provided via the at least one functional monomer A2-I) which, during the process of production of the polymeric composition (and, respectively, the thermoplastic processing of the composition), can react with chemical groups of the surface of the reinforcing fiber B, whereupon a polymeric composition and, respectively, a molding with good robustness is obtained. The polymer A2 often increases the polarity of the thermoplastic molding composition A, thus increasing compatibility with the polar reinforcing fibers, preferably the glass fibers.

In a preferred embodiment, the polymer A2 comprises at least 0.1% by weight, preferably 0.1 to 3% by weight, particularly preferably 0.15 to 1% by weight, with particular preference 0.15 to 0.25% by weight, based on the polymer A2, of the at least one functional monomer A2-I.

In a preferred embodiment, the functional monomers A2-I are selected from the group consisting of maleic anhydride (MA), N-phenylmaleimide (PM), tert-butyl(meth)acrylate and glycidyl(meth)acrylate (GM), being in particular selected from the group consisting of maleic anhydride (MA), N-phenylmaleimide (PM) and glycidyl(meth)acrylate (GM).

It is preferable that the polymer A2 is a polymer of ethylene, propylene, butylene, and/or isobutylene, where the polymer comprises at least one functional monomer A2-I selected from maleic anhydride. N-phenylmaleimide, tert-butyl(meth)acrylate and glycidyl(meth)acrylate. It is preferable that the polymer A2 is a copolymer of propylene and of one or more of the abovementioned functional monomers A2-1.

It is particularly preferable that the polymer A2 is a polypropylene graft copolymer, where one or more of the abovementioned functional monomers A2-I have been grafted onto a polypropylene.

It is preferable that the polymer A2 is a propylene-maleic anhydride graft copolymer. Such modified polypropylenes are known by way of example as the products PRIEX® 20093 (ADDCOMP), Orevac® CA100 (Arkema) and Scona® TPPP 9021 (BYK).

It is particularly preferable that the polymer A2 is one or more propylene-maleic anhydride graft copolymers which have a content of maleic anhydride as monomer A2-I in the range of 0.01 to 5% by weight, preferably 0.1 to 0.4% by weight, particularly preferably 0.15 to 0.25% by weight, based on the polymer A2.

In particular, the polymer A2 is one or more propylene-maleic anhydride graft copolymers which have a density of about 0.9 g/cm$^3$, in particular of 0.895 to 0.915 g/cm$^3$, and/or a melt flow index (determined in accordance with DIN EN ISO 1133, at 190° C./0.325 kg) in the range of 9 to 13 g/10 min.

It is preferable that the polyolefin polymer A2 is one or more propylene-maleic anhydride graft copolymers which have a melting point (measured in accordance with DIN EN ISO 11357-3) in the range of 160 to 165° C. and/or a viscosity (measured in accordance with DIN EN ISO 1628-1) in the range of 0.07-0.08 l/g, The Reinforcing Fiber B The polymeric composition comprises at least 10% by weight, preferably at least 20% by weight, particularly preferably at least 30% by weight, based on the total weight of the polymeric composition, of the reinforcing fiber B.

The quantity of the at least one reinforcing fiber B present in the polymeric composition is 10 to 79% by weight, preferably 20 to 60% by weight, particularly preferably 25 to 50% by weight, based on the polymeric composition, It is preferable that the quantity of the reinforcing fiber B present in the polymeric composition is 10 to 80% by volume, preferably 20 to 70% by volume and with particular preference 30 to 50% by volume, based on the polymeric composition.

The density of the reinforcing fiber B is typically in the range of 1.4 to 2.8 g/cm$^3$. The density of the reinforcing fiber B selected from glass fibers is typically in the range of 1.8 to 2.8 g/cm$^3$, The density of the reinforcing fiber B selected from carbon fibers is typically in the range of 1.4 to 1.8 g/cm$^3$.

The reinforcing fiber B typically has a filament diameter in the range of 5 to 20 µm, preferably 9 to 15 µm. The filaments of the reinforcing fiber B have often been bundled to give ravings, woven fabrics and/or yarns.

In another embodiment, the surface of the reinforcing fibers B comprises one or more functional groups, preferably polar functional groups, with particular preference functional groups selected from hydroxy, ester, amino and silanol groups.

In another embodiment the reinforcing fiber B is one or more glass fibers. With particular preference, the at least one reinforcing fiber B is one or more glass fibers whose surface comprises functional groups selected from hydroxy, ester, amino and silanol groups, preferably silanol groups.

The known grades of glass fibers are typically used, in accordance with requirements and application sector, examples being glass fibers of the type represented by E glass (E=electric; aluminoborosilicate glass with less than 2% of alkali metal oxides), S glass (S=strength; aluminosilicate glass with additions of magnesium oxide), R glass (R=resistance, aluminosilicate glass with additions of calcium oxide and magnesium oxide), M glass (M=modulus, beryllium-containing glass), C glass (C=chemical, fiber with increased chemicals resistance), ECR glass (corrosion-resistant E glass), D glass (D=dielectric, fiber with low dielectric loss factor), AR glass (AR=alkaline-resistant, fiber developed for use in concrete, enriched with zirconium(IV) oxide), Q glass (Q=quartz, fiber made of quartz glass $SiO_2$) and hollow glass fibers.

Glass fibers of the type represented by E glass are often used as standard fiber for general plastics reinforcement and for electrical applications.

It is moreover possible to use carbon fibers as reinforcing fiber B. Carbon fibers are typically industrially manufactured fibers made from carbon-containing starting materials, which are converted by means of chemical reactions appropriate to the raw material into carbon arranged in the manner of graphite. Familiar isotropic and anisotropic types can be used, and anisotropic fibers here typically exhibit high values for strength and stiffness together with low tensile strain at break in axial direction. Carbon fibers are often used as stiffening component for lightweight construction. The diameter of carbon fibers is typically about 5-9 micrometers, and 1000 to 24000 filaments are usually combined here to give a multifilament yarn (roving).

The reinforcing fibers B can also have been embedded in the form of layers in the polymeric composition and, respectively, in the molding or material produced therefrom. The reinforcing fiber B can take the form of sheet F.

Inorganic Filler C

The polymeric composition comprises at least 1% by weight, preferably at least 5% by weight, particularly preferably at least 8% by weight, based on the total weight of the polymeric composition, of the at least one inorganic filler C. The quantity of the at least one inorganic filler C present in the polymeric composition is 1 to 70% by weight, preferably 1 to 60% by weight, preferably 5 to 35% by weight, with particular preference 8 to 18% by weight, based on the entire polymeric composition.

It is preferable that the at least one inorganic filler C is selected from mineral fillers, which can be either in crystalline form or else in amorphous form (in particular as glass). It is preferable that the at least one inorganic filler C is selected from glass powder, amorphous silica, carbonates (e.g. magnesium carbonate, calcium carbonate (chalk)), powdered quartz, mica, silicates, e.g. clay, muscovite, biotite, suzoite, tin maletite, talc, chlorite, phlogopite, feldspar; kaolin and calcium silicates (e.g. wollastonite), In a preferred embodiment, the polymeric composition of the invention comprises at least 1% by weight, preferably 1 to 70% by weight, with particular preference 1 to 30% by weight, of the at least one inorganic filler C.

In a preferred embodiment, the polymeric composition of the invention comprises 1 to 30% by weight of at least one inorganic filler C in crystalline and/or amorphous form, selected from silicates, phosphates, sulfates, carbonates and borates.

In a preferred embodiment, fillers C with an average particle size $D_{50}$ in the range of up to 100 µm, preferably of up to 10 µm, particularly preferably of up to 1 µm, are used as filler C.

The invention uses inorganic fillers C which have a coefficient of linear thermal expansion $\alpha_C$ (CLTE, coefficient of linear thermal expansion, measured in accordance with ISO 11359-1 and ISO 11359-2) which is smaller than the coefficient of linear thermal expansion $\alpha_A$ of the thermoplastic molding composition A, i.e. $\alpha_C < \alpha_A$.

It is preferable that the inorganic fillers C have a coefficient of linear thermal expansion $\alpha_C$ (CLTE, coefficient of linear thermal expansion, measured in accordance with ISO 11359-1 and ISO 11359-2) in the range of $2*10^{-6}$ to $20*10^{-6}$ $K^{-1}$, preferably $5*10^{-6}$ to $15*10$ $K^{-1}$, with particular preference $7*10^{-6}$ to $12*10^{-6}$ $K^{-1}$.

The invention uses inorganic fillers C for which:

$$\frac{\alpha_{V,C} \times \text{proportion by volume of } C}{\alpha_{V,B} \times \text{proportion by volume of } B} = 0.1 - 10$$

preferably 0.2-5, with particular preference 0.5-3, where $\alpha_{V,C}$=coefficient of thermal volume expansion of C in 1/K, proportion by volume of C=proportion by volume of C, based on the entire polymeric composition, in % by volume/100;

$\alpha_{V,B}$=coefficient of thermal volume expansion of B in 1/K, proportion by volume of B=proportion by volume of B, based on the entire polymeric composition, in % by volume/100;

and where $\alpha_{V,C}=3*\alpha_C$; and $\alpha_{V,B}=3*\alpha_B$ where $\alpha_C$=average coefficient of linear thermal expansion of C $\alpha_B$=average coefficient of linear thermal expansion of B.

Details relating to the determination of the coefficient of linear thermal expansion $\alpha$ and of the coefficient of thermal volume expansion $\alpha_V$ have been described at an earlier stage above.

During the production of the polymeric composition of the invention, the inorganic filler C is typically added to the thermoplastic molding composition A.

Further Additive(s) D

The polymeric composition of the invention can optionally comprise 0 to 10% by weight, preferably 0 to 5% by weight, particularly preferably 0.01 to 10% by weight, particularly preferably 0.1 to 5% by weight, based on the entire polymeric composition, of one or more additives D. The optional additive D is typically conventional auxiliaries and conventional additional substances which respectively differ from components A to C. Examples of typical plastics additives are described in H. Zweifel et al., Plastics Additives Handbook, Hansel Verlag, $6^{th}$ edn., 2009.

During the production of the polymeric composition of the invention, the additives D are typically added to the thermoplastic molding composition A.

By way of example, the at least one further additive D can be selected from processing aid, stabilizers, lubricants and mold-release agents, flame retardants, dyes, pigments and plasticizers. Examples of stabilizers used are antioxidants (oxidation retarders), and also agents to inhibit decomposition by heat (heat stabilizers) and decomposition by ultraviolet light (UV stabilizers).

Examples of suitable UV stabilizers are various substituted resorcinols salicylates, benzotriazoles and benzophenones. Quantities typically used of UV stabilizers are up to 2% by weight, preferably from 0.01 to 2% by weight, based on the entire polymeric composition. Widely used UV stabilizers are described by way of example in H. Zweifel et al., Plastics Additives Handbook, Hanser Verlag, $6^{th}$ edn., 2009, pp. 246-329.

Examples of suitable antioxidants and heat stabilizers are sterically hindered phenols, hydroquinones, substituted members of this group, secondary aromatic amines, optionally in conjunction with phosphorus-containing acids and, respectively, their salts, and mixtures of these compounds. Examples of widely used antioxidants are described by way of example in H. Zweifel et al., Plastics Additives Handbook, Hanser Verlag, $6^{th}$ edn., 2009, pp. 40-64.

It is preferable to use antioxidants of the Irganox® (BASF) type. Quantities typically used of antioxidants and heat stabilizers are up to 1% by weight, preferably from 0.01 to 1% by weight, based on the entire polymeric composition.

In a preferred embodiment, the polymeric composition of the invention comprises one or more lubricants and mold-release agents as additives D. Widely used lubricants and mold-release agents are described by way of example in H. Zweifel et al., Plastics Additives Handbook, Hanser Verlag, $6^{th}$ edn., 2009, pp. 563-580. Examples of suitable lubricants and mold-release agents are stearic acid, stearyl alcohol, stearic esters and stearamides, and also esters of pentaerythritol with long-chain fatty acids. It is possible by way of example to use the calcium, zinc or aluminum salts of stearic acid, and also dialkyl ketones, for example distearyl ketone. It is moreover also possible to use ethylene oxide-propylene oxide copolymers as lubricants and mold-release agents. Natural and/or synthetic waxes can moreover be used. The following may be mentioned by way of example: PP waxes, PE waxes, PA waxes, grafted PO waxes, HDPE waxes, PTFE waxes, EBS waxes, montane wax, carnauba wax and beeswax. Quantities typically used of lubricants and mold-release agents are up to 1% by weight, preferably from 0.01 to 1% by weight, based on the entire polymeric composition.

In a preferred embodiment, the polymeric composition of the invention comprises 0.1 to 1% by weight, preferably 0.5 to 0.9% by weight, of lubricants and mold-release agents as additives D, where the lubricant and mold-release agent is preferably selected from stearic esters, with particular preference from glycerol monostearate.

Suitable flame retardants can be halogenated or else halogen-free compounds. Suitable halogen compounds are chlorinated and/or brominated compounds, brominated compounds being preferred to the chlorinated compounds. Preference is given to halogen-free compounds, for example to phosphorus compounds, in particular to phosphine oxides and to derivatives of phosphorus acids and to salts of phosphorus acids and of phosphorus acid derivatives. Phosphorus compounds particularly preferably comprise ester, alkyl, cycloalkyl and/or aryl groups. Oligomeric phosphorus compounds with a molar mass below 2000 g/mol are likewise suitable, as for example in EP-A 0 363 608.

Pigments and dyes can moreover be present as additives D in the polymeric composition of the invention, Quantities present of these are typically from 0 to 10% by weight, preferably 0.1 to 10% by weight and in particular 0.5 to 8% by weight, based on the entire polymeric composition. Typical pigments for the coloring of thermoplastics are well known, see by way of example H. Zweifel et al., Plastics Additives Handbook, Hanser Verlag, $6^{th}$ edn., 2009, pp. 855-868 and 883-889, and also R. Gächter and H. Müller, Taschenbuch der Kunststoffadditive [Handbook of plastics additives], Carl Hanser Verlag, 1983, pp. 494 to 510. A first preferred group of pigments that should be mentioned comprises white pigments such as zinc oxide, zinc sulfide, white lead (2 PbCO$_3$·Pb(OH)$_2$), lithopones, antimony white and titanium dioxide. Of the two most frequently used crystalline forms of titanium dioxide (rutile and anatase), it is in particular the rutile form that is used for white coloring of the molding compositions of the invention. Another preferred group of pigments that should be mentioned comprises black pigments, for example iron oxide black (Fe$_3$O$_4$), spinel black (Cu(Cr,Fe)$_2$O$_4$), manganese black (mixture of manganese dioxide, silicon oxide and iron oxide), cobalt black and antimony black, and also particularly preferably carbon black, which is mostly used in the form of furnace black or gas black (in this connection see G. Benzing, Pigmente für Anstrichmittel [Pigments for paints], Expert-Verlag (1988), pp. 78 ft).

In order to achieve particular hues it is moreover possible in the invention to use inorganic chromatic pigments such as chromium oxide green, or organic chromatic pigments, such as azo pigments and phthalocyanines. Pigments of this type are widely commercially available. It can moreover be advantageous to use the pigments and, respectively, dyes mentioned in a mixture, an example being carbon black with copper phthalocyanines.

Process for the Production of the Polymeric Composition

The invention further provides a process for the production of the polymeric composition of the invention, comprising the mixing of the components A, B, C and optionally D, in particular at temperatures of at least 200° C., preferably at a temperature in the range of 200 to 330° C.

In a preferred embodiment, a thermoplastic matrix M is first produced, which is then mixed with the reinforcing fiber B.

During the production process, the step of reaction of functional groups of the thermoplastic matrix M with functional groups on the surface of the reinforcing fibers B typically takes place.

The process optionally comprises the cooling of the mixture and optionally further process steps.

Thermoplastic Matrix M

The thermoplastic matrix M in the invention comprises the thermoplastic molding composition A described above, which comprises the at least one semicrystalline polymer A1, preferably the at least one semicrystalline polyolefin polymer A1, and optionally the at least one polymer A2, comprising at least one functional monomer A2-I, and also optionally further polymers A3. The thermoplastic matrix M moreover comprises the at least one inorganic filler C, as described above, in particular a glass powder.

In a preferred embodiment, the thermoplastic matrix M consists of the thermoplastic molding composition A and of the inorganic filler C and optionally of the component D. The thermoplastic matrix M is typically provided via mixing of the components A and C and optionally D.

The preferred embodiments in respect of the composition of the polymeric composition and of the components A, B, C and D, as described above in connection with the composition of the invention, also apply correspondingly to the process of the invention.

It is preferable that the functional groups of the thermoplastic matrix M are the functional groups of the polymer A2, typically the functional groups of the functional monomer A2-I.

In a preferred embodiment, the thermoplastic matrix consists of 40 to 50% by volume of the at least one inorganic filler C, preferably selected from particulate, mineral or amorphous (glassy) fillers, preferably selected from glass powders, and 60 to 50% by volume of the thermoplastic molding composition A described above, which preferably consists of the polymers A1 and A2.

The process of the invention for the production of the polymeric composition can take place continuously, semi-continuously or batchwise.

In a preferred embodiment, the process is carried out as continuous process, in particular as continuous process by way of example for the production of smooth or three-dimensionally embossed films.

Alternatively, the process of the invention can be carried out semicontinuously or batchwise.

The process for the production of the polymeric composition of the invention can preferably be carried out by means of known melt-compounding processes, e.g. extrusion.

It is moreover possible that the reinforcing fibers B are pretreated and, respectively, impregnated before mixing with the thermoplastic matrix M. In particular, at least a portion of the reinforcing fibers B is subjected to a pretreatment, with a resultant effect on the subsequent fiber-matrix adhesion. The pretreatment can by way of example comprise a coating step, an etching step, a heat-treatment step or a mechanical-surface treatment step. In particular it is possible by way of example by heating of a portion of the reinforcing fibers B to remove, to some extent, a previously applied adhesion promoter.

The present invention moreover comprises a process for the production of a molding with the use of the polymeric composition of the invention. The production of the molding is usually achieved with the aid of the known forming processes, for example compression molding, rolling, hot pressmolding, stamping, and/or of the known thermoplastic shaping processes, e.g. injection moldings. It is preferable that a (substantially) solid molding is obtained at the end of the process. The process therefore preferably comprises, as further step, the hardening of the molding. The molding can optionally also undergo downstream operations, for example through the steps of deflashing, polishing, and/or dyeing.

A further aspect of the invention relates to the use of the polymeric composition of the invention for the production of moldings, for example by conventional forming processes, as described above, for example compression molding, rolling, hot pressmolding, stamping.

The examples and claims below provide further explanation of the present invention.

EXAMPLE 1

The following experiments were carried out in a simple, heated batch press at temperatures of approximately 230-240° C., the pressure in the press being about 10 bar.

The average coefficients of linear thermal expansion a were measured as arithmetic average of the values in longitudinal and transverse direction in accordance with ISO 11359-1,2.

Components:

A1 Polypropylene

Polypropylene homopolymer, with a density <0.9 g/cm$^3$; melt volume flow rate MVR (230° C./2.16 kg) 50-70 ml/10 min, mostly 60 ml/10 min; crystallization temperature (DSC) 130° C. Coefficients of thermal expansion $\Omega_{A1}=60*10^{-6}$ K$^{-1}$, coefficient of thermal volume expansion $\alpha_{V,A1}=3*\alpha_{A1}=180*10^{-6}$ K$^{-1}$ A2 PRIEX® 20093 (Altana, AddComp)

Chemically modified polypropylene polymer (white granulate) with a high content of grafted-on maleic anhydride (0.15-0.25% by weight) with a density of about 0.9 g/cm³. Coefficients of thermal expansion $\alpha_{A2c}=65*10^{-6}$ K⁻¹, coefficient of thermal volume expansion $\alpha_{V,A2}=3*\alpha_{A2}=195*10^{-6}$ K⁻¹

B Glass Fiber

Reinforcing fiber B used was a glass fiber twill with the following properties: size made of PP polymer, weight per unit area 600 g/m², 1200 tex warp threads. Coefficients of thermal expansion $\alpha_B=7*10^{-6}$ K⁻¹, coefficient of thermal volume expansion $\alpha_{V,B}=3*\alpha_B=21*10^{-6}$ K⁻¹, density of B=about 2.5 g/ml.

C Inorganic Filler

The following fillers C were used:

C1 (of the Invention):

Glass powder with average particle size of approximately 50 μm

Coefficients of thermal expansion $\alpha_{C1}=8*10^{-6}$ K⁻¹, coefficient of thermal volume expansion $\alpha_{V,C1}=3*\alpha_{C1}=24*10^{-6}$ K⁻¹, density of C1=about 2.5 g/ml.

C2 (Comparison):

Polyamide-66 powder with average particle size of approximately 50 μm.

Coefficients of thermal expansion $\alpha_{C2}=80*10^{-6}$ K⁻¹, coefficient of thermal volume expansion $\alpha_{V,C2}=3*\alpha_{C,2}=240*10$ K⁻¹, density of C2=1.3 g/ml.

The polymeric compositions described in table 1 with a thickness of 1.0 mm and 45% by volume content of glass fiber (component B as described above) were produced from the components described above by means of the process described above.

Mechanical Characterization:

Maximal flexural stress $\sigma_{max}$ was determined on the resultant compositions (moldings) by the three-point flexural test in accordance with DIN 14125. The values were measured respectively in the direction 0° (in fiber direction) and 90° (perpendicularly to the fiber direction). Table 1 presents the results. Optical appearance was assessed visually on the basis of the following system:

0: Completely flat, mirror-smooth surface
 1: Slight undulations on a flat surface
 2: Significant undulations, but gloss remains high
 3: Large number of undulations, moderate gloss
 4: Rough surface, low gloss Example V3 is inventive; example V4 serves as comparative example.

What is claimed is:

1. A polymeric composition comprising:
 a) 20 to 79% by weight of a thermoplastic molding composition A, wherein the thermoplastic molding composition A comprises at least one semicrystalline polyolefin polymer A1; wherein the semicrystalline polyolefin polymer A1 is one or more semicrystalline homo- or copolymers of ethylene, propylene, butylene, and/or isobutylene; and wherein the thermoplastic molding composition A comprises 60 to 99.9% by weight of the at least one semicrystalline polyolefin polymer A1 and 0.1 to 40% by weight of at least one polymer A2, respectively, based on the entire thermoplastic molding composition A;
 b) 10 to 79% by weight of at least one reinforcing fiber B;
 c) 1 to 70% by weight of at least one inorganic filler C;
 d) 0 to 10% by weight of at least one further additive D;
 wherein the at least one inorganic filler C has a coefficient of linear thermal expansion ac (measured in accordance with ISO 11359-1 and ISO 11359-2) which is smaller than the coefficient of linear thermal expansion $\alpha_A$ of the thermoplastic molding composition A,
 wherein the at least one inorganic filler C has a volume shrinkage which is 0.1 to 10 times as great as the volume shrinkage of the reinforcing fiber B, wherein the volume shrinkage is calculated from the coefficient of thermal volume expansion $\alpha_v$ in 1/K of the respective component multiplied by the proportion of the respective component in the polymeric composition in % by volume/100, wherein:

$$\frac{\alpha_{V,C} \times \text{proportion by volume of } C}{\alpha_{V,B} \times \text{proportion by volume of } B} = 0.1 - 10$$

wherein:
 $\alpha_{V,C}$=coefficient of thermal volume expansion of C in 1/K, wherein $\alpha_{V,C}=3*\alpha_C$;
 proportion by volume of C=proportion by volume of C, based on the entire polymeric composition, in % by volume/100;
 $\alpha_{V,B}$=coefficient of thermal volume expansion of B in 1/K,

TABLE 1

| Production and characterization of the polymeric compositions | | | | | | |
|---|---|---|---|---|---|---|
| | | V1 | V2 | V3 (inv.) | V4 (comp.) |
| A1 | % by wt. | 50 | 55 | 35 | 35 |
| A2 | % by wt. | 5 | 0 | 5 | 5 |
| B | % by wt. | 45 | 45 | 30 | 30 |
| C1 | % by wt. | 0 | 0 | 30 | 0 |
| C2 | % by wt. | 0 | 0 | 0 | 30 |
| $\frac{\alpha_{V,C} \times \text{proportion by volume of } C}{\alpha_{V,B} \times \text{proportion by volume of } B}$ | | — | — | 1.1 | 22 |
| Flexural stress $\sigma_{max}$ 0° | MPa | 3121 | 240 | — | — |
| Flexural stress $\sigma_{max}$ 90° | MPa | 325 | 274 | — | — |
| Optical assessment of surface | | 3 | 4 | 2 | 3 | wherein $\alpha_{V,B}=3*\alpha_b$;
proportion by volume of B=proportion by volume of B, based on the entire polymeric composition, in % by volume/100; and
wherein the data in % by weight and in % by volume, respectively, are based on the entire polymeric composition.

2. The polymeric composition of claim 1, wherein the at least one semicrystalline polyolefin polymer A1 is selected from polypropylene and polyethylene.

3. The polymeric composition of claim 1, wherein the semicrystalline polyolefin polymer A1 is one or more polypropylene homopolymers.

4. The polymeric composition of claim 1, wherein the semicrystalline polyolefin polymer A1 is one or more semicrystalline polypropylene homopolymers, wherein the polypropylene homopolymer has less than 60% by weight of amorphous content, based on the polyolefin polymer A1.

5. The polymeric composition of claim 1, wherein the semicrystalline polyolefin polymer A1 is one or more semicrystalline polypropylene homopolymers, wherein the polypropylene homopolymers have a melt volume rate in the range of 50 to 70 ml/10 min.

6. The polymeric composition of claim 1, wherein the polymer A2 is at least one polymer of ethylene, propylene, butylene, and/or isobutylene, wherein the polymer comprises at least one functional monomer A2-I, selected from maleic anhydride, N-phenylmaleimide, tert-butyl(meth)acrylate, and glycidyl(meth)acrylate.

7. The polymeric composition of claim 1, wherein the polymer A2 is one or more propylene-maleic anhydride graft copolymers which have a proportion of maleic anhydride as monomer A2-I in the range of 0.01 to 5% by weight, based on the polymer A2.

8. The polymeric composition of claim 1, wherein the at least one reinforcing fiber B is one or more glass fibers whose surface comprises functional groups, selected from hydroxy, ester, amino, and silanol groups.

9. The polymeric composition of claim 1, wherein the polymeric composition comprises 1 to 30% by weight of at least one inorganic filler C.

10. The polymeric composition of claim 1, wherein the polymeric composition comprises at least one inorganic filler C in crystalline and/or amorphous form, selected from glass powder, amorphous silica, powdered quartz, phosphates, sulfates, and borates.

11. The polymeric composition of claim 1, comprising:
a) 25 to 55% by weight of the at least one thermoplastic molding composition A;
b) 40 to 60% by weight of the at least one reinforcing fiber B;
c) 5 to 35% by weight of the at least one inorganic filler C; and
d) 0 to 10% by weight of at least one further additive D.

12. A process for the production of a polymeric composition of claim 1, comprising the mixing of the components A, B, C, and optionally D.

13. The process of claim 12, wherein the mixing takes place at a temperature of at least 200° C.

14. A process for the production of a molding, comprising the polymeric composition of claim 1, wherein the process comprises a step of thermoplastic shaping of the polymeric composition.

15. The process of claim 14, wherein the thermoplastic shaping of the polymeric composition is selected from compression molding, rolling, hot pressmolding, and/or stamping.

16. The process of claim 14, wherein the molding undergoes a downstream operation.

17. The process of claim 16, wherein the downstream operation comprises the steps of deflashing, polishing, dyeing, or a combination thereof.

18. The polymeric composition of claim 1, wherein the at least one reinforcing fiber B is in the form of fiber bundles.

19. The polymeric composition of claim 1, wherein the at least one reinforcing fiber B comprises filaments bundled to give a roving, woven fabric and/or yarn.

* * * * *